INVENTOR.
EDWARD C. MUTSCHLER
ULDIS KLAVSONS
BY Anthony D. Cennamo
Daniel Rubin
ATTORNEYS

FACSIMILE RECORDING APPARATUS

Filed June 24, 1965 2 Sheets-Sheet 2

INVENTOR.
EDWARD C. MUTSCHLER
ULDIS KLAVSONS
BY Anthony D. Cennamo
Daniel Rubin
ATTORNEYS United States Patent Office 3,329,964

Patented July 4, 1967

3,329,964
FACSIMILE RECORDING APPARATUS

Edward C. Mutschler, Pittsford, and Uldis Klavsons, Penfield, N.Y., assignors to Xerox Corporation, Rochester, N.Y., a corporation of New York Filed June 24, 1965, Ser. No. 466,687
3 Claims. (Cl. 346—78)

ABSTRACT OF THE DISCLOSURE

A liquid ink recording apparatus wherein a recording pin is actuated by an elecromechanical transducer to reciprocate around an orifice of a capillary tube to deposit ink droplets onto a recording medium in response to electrical signals applied to the electromechanical transducer. This electromechanical transducer is coupled to the reciprocating pin and is associated with an electrical compensating network connected to the input of this transducer to aid and oppose the beginning and end strokes of the pin.

This invention relates to facsimile recording and in particular to novel apparatus for depositing liquid ink onto a recording surface in response to emitted voltage signals of information intelligence.

Facsimile recording, as is generally known, is a system for sending graphic or other forms of intelligence information over long distances by electrical means. In a facsimile transmitter, a subject copy such as a page of graphic information, is scanned by a light beam, a minute area at a time, until the entire page has been swept by the scanning beam. The reflected light, modulated in intensity by the copy information, is picked up by a phototube or the like and converted into electrical signals. Ordinarily, the light beam is interrupted at a fixed rate, or a carrier frequency is added to the signal, so that each cycle represents one elemental area of the copy being scanned. The signals are then transmitted over telephone lines or by radio to a facsimile receiver with which there is associated a print-out process to record each elemental area as black or white in accordance with the corresponding area originating from the subject copy.

In the marketing of any form of graphic reproduction process and apparatus, copy quality is one of the most critical factors affecting acceptance. Copy quality is determined by such well defined parameters as resolution, density, contrast and permanence and by such more or less subjective considerations as paper color, texture, feel and appearance. In facsimile recording, therefore, it is necessary to consider all these qualities, but foremost the print-out process must be matched to the whole facsimile system so that the copy produced is of the highest quality attainable. Therefore, whatever limitations might otherwise be imposed, the resolution of the reproduction should nearly as possible approach the theoretical optimum as compared to the original so that copy quality is the best possible within the limitations of the system. To achieve this level of operation, the system should be capable of one element response, e.g., if scanning a vertical line one element wide, the recorder should respond with a single recorded dot.

Although many techniques are known for producing a facsimile recording, the simplest is that in which a marking implement produces a direct visible image on a recording surface. However, on recording in response to a received voltage signal, it has heretofore been generally difficult at the high writing rates required, to obtain rapid on-off operation of the marking implement in closely correlated response to the input signal. In various arrangements using liquid ink, the ink has tended to splatter, drag, skip, or otherwise produce unacceptable images. As a result, recording devices using liquid ink have been largely limited to recording oscillographs, seismographs, and other purposes for which a continuous ink line is acceptable. These have therefore supplied recording information only by the movement of a continuous line back and forth with relation to some reference axis.

In copending application, Ser. No. 320,762, filed Nov. 1, 1963, now abandoned, and incorporated herein by refence, there is disclosed a recording pen that is operatively responsive to electrical signals for depositing ink droplets onto a recording surface. The pen as described therein, operates by reciprocation of a pin mounted coaxially in an ink-filled capillary tube. The terminal end of the pin is adapted, when reciprocated in response to a received signal, to puncture the ink meniscus in passing exterior of the capillary as to carry a uniform ink droplet onto the recording surface. While comprising a substantial advance over prior art techniques, the operating frequency thereof has nonetheless been limited by the capacity of the transducer mechanism to respond closely correlated to the input signals as the required writing rate increased from about 1200 dots per second and above. This can be better appreciated when it is understood that with a relatively rigid mechanical system of transduction, as the frequency of dot writing rate increases, the associated acceleration forces increase as the square of the frequency while the power increases as the cube thereof. At the same time, elastic mechanical transducer systems have been regarded as particularly unsuitable for high frequency print-out because of the inherent response lag caused by the mass and resiliency of the materials. That is an elastic system inherently is incapable of single element response at a constant power input since more than one cycle is required to attain full amplitude. On the other hand, elasticity in the transducer element affords the benefit of an inherent return of the recording implement to a neutral position during non-writing periods to prevent drag on the recording paper.

Now in accordance with the invention hereof, there is provided an elastic electromechanical transducer system including a compensating electrical network which when used in combination with a recording implement, as for example described in the aforesaid copending application, increases the reliable frequency capability thereof up to about 10,000 dots per second without splattering, dragging or skipping. By employing a compensating network, the system "Q," i.e., the measure of damping in the vibration system, substantially approaches unity as in a non-elastic system, while requiring substantially less acceleration force and power than is required thereby. The network automatically functions to aid and oppose the beginning and end strokes respectively of the elastic output as to achieve a one element response in the overall recording system and causing the system as a whole to react inelastically. By interacting with the mechanical elements of the transducer, the network achieves the desired single element response with a total system power not greater than that required for a non-elastic system. Since the power dissipation is distributed between the compensating network and the transducer, it becomes possible to employ a transducer of physically less mass than previously required.

It is therefore an object of the invention to provide novel facsimile recording apparatus for depositing liquid ink selectively on a receipt of a voltage signal of intelligence.

It is a further object of the invention to provide novel transducer mechanisms for adapting a mechanically operable facsimile recording pen to higher frequencies of operation.

It is a still further object of the invention to provide a novel transducer system for a facsimile recording pen having increased responsiveness and requiring less power and force for operability as compared to prior art transducers.

It is a still further object of the invention to provide a novel elastic transducer system for operation of a facsimile recording implement having a system "Q" approaching unity.

It is a still further object of the invention to provide a transducer for a facsimile recorder capable of one element response at increased operational frequencies.

It is a still further object of the invention to employ a transducer for a facsimile recorder having substantially less physical mass than has been required heretofore.

Further objects and features of the invention will become apparent by reading the following description in connection with the drawings wherein:

FIG. 1 diagrammatically illustrates the operative components of a facsimile recording implement in accordance herewith;

Figures 1, 2, 3, 4:
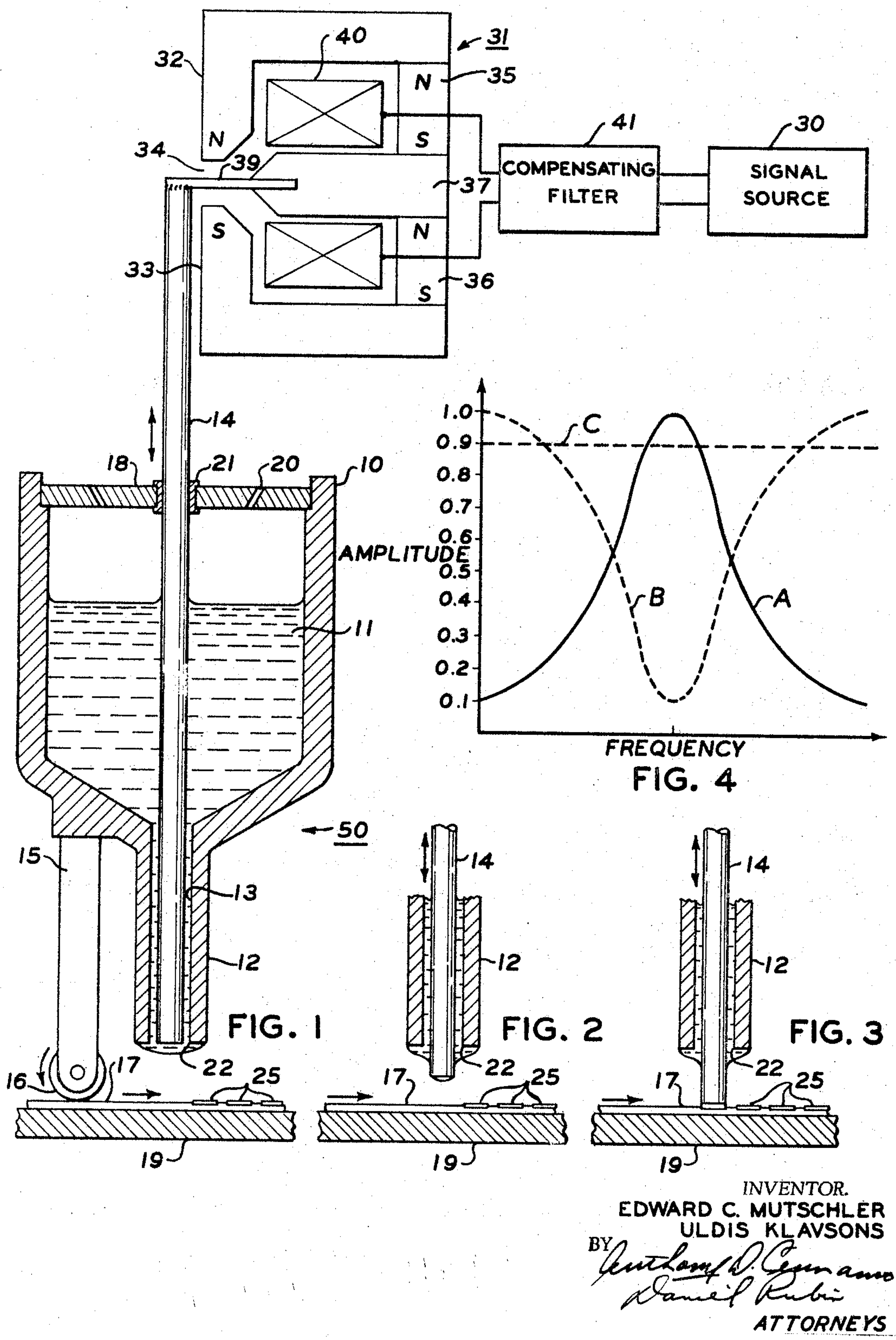
FIGS. 2 and 3 are fragment views depicting the flow steps in operation of the recording pen of FIG. 1.
FIG. 4 is a graphical representation of the functioning relation of a transducer mechanism and a compensating network therefor.

As illustrated in FIG. 1 there is disclosed a recording pen 50 as more completely described in copending application supra, and comprising an ink reservoir 10, containing a quantity of liquid ink 11 and extending vertically contnuous with a cylindrical capillary tube 12 so as to open directly into capillary bore 13. Positioned coaxially within the capillary and extending up through the ink reservoir is a needle pin 14 which is adapted for reciprocal operation in response to the electro mechanical transducer system of the invention as will be described below. The entire unit is supported with the open orifice 22 of bore 13 closely spaced a controlled distance from the surface of a recording sheet 17 by means of support member 15 extending vertically from the underside of the reservoir and terminating in a foot 16, such as roller or other suitable slideable member. The top of the reservoir is closed with a cover 18 to prevent ink splashing therefrom and is provided with suitable vent holes 20 to maintain atmospheric pressure within the reservoir. A gland seal 21 in the central portion of the cover is provided through which pin 14 is free to move.

As pin 14 is reciprocated, the action thereof aids ink flow from the reservoir to the orifice 22 of the capillary whereat the ink forms a meniscus. As the pin moves downward in its stroke, it passes through the meniscus to carry a portion of ink on the tip thereof towards the recording sheet 17 below relatively moving on a support 19. As the pin continues downwardly to its end of travel the small portion of ink on its terminal end, but not the pin itself, reaches the recording sheet to form an ink deposit 25 thereon. On reaching the latter position, the pin is then retracted upwardly leaving the deposited ink on the recording sheet and returning to a position inside the capillary permitting a new meniscus of ink to form at the orifice 22. As shown in FIG. 1, the pin is in its uppermost retracted position far enough withdrawn so that it does not interfere with the formation of a meniscus of ink at the orifice 22.

In FIG. 2, there can be seen the pin moving downwardly through the ink meniscus carrying an ink portion generally corresponding dimensionally to the surface area of the terminal end of the pin 14. As this portion of ink is carried downwardly it breaks the surface tension and overcomes the other cohesive forces which tend to resist the separation of ink from the meniscus so that only a small and controlled portion of ink is delivered to the recording surface, as illustrated in FIG. 3. Since the delivered quantity of ink has been broken from the main body thereof as a function of pin diameter, relative to the tube bore each pin reciprocation causes a uniform size ink deposit onto the passing recording surface 17. Motion of the pin upward within the ink in the capillary exerts much less drag on the ink than does the inner wall of the capillary. This assures a continuous supply of ink at the orifice for reforming a meniscus with each retraction of the pin to produce a net flow of ink from the tube on each downward stroke of the pin.

The support 15 limits the pin position on its downward stroke to a precise spacing relative to the surface of the recording sheet such that pin 14 never strikes the recording surface. Instead, the spacing is such that the pin even in its lowermost position is separated from the recording sheet a distance corresponding approximately to the vertical dimension of the ink droplet. This has been found essential since contact between the pin and the recording surface has been found to cause some splattering of the ink before it can be absorbed into the recording surface while also producing some lateral ink drag caused by the relative movement of the recording sheet.

The materials of which the recording pen are made are not particularly critical. The reservoir and capillary tube may be made of metal, glass, plastic or other conventional material. The pin may be stainless steel or other corrosion resistant metal selected for its structural strength. The capillary tube and the coaxial pin, should be both wettable by whatever ink is employed. However, this is conventional and where the materials do not have the desired wettability, surface treatments as are well known in the art, can produce the required wettability.

Most commercial pen inks are compatible with the pen described above. For example, "Scrip" Washable #64 Black and "Scrip" Permanent #34 Jet Black, available from the W. A. Schaeffer Pen Company, as well as numerous colored inks have proved suitable.

Intelligence information to be reproduced originates from a signal source 30 to be transmitted through the transducer connected to pin 14. In order that the reciprocation of pin 14 be accurately responsive in correspondence to the signals originating from source 30, the transducing mechanism must per se have sufficient response sensitivity to reflect the generation and termination of the received signal which is then translated to reciprocal movement of pin 14. When reproducing dots on the order of 6,000 per second, and above it can be appreciated that the momentum must be instantly generated without elastic residual to transmit positive movement to the pin. In order to achieve this result, in accordance with the invention hereof, there is provided an elastic transducer mechanism 31 having a frequency characteristic as exemplified by curve A of FIG. 4.

The transducer in the embodiment illustrated is comprised of a pair of pole pieces 32 and 33 terminating spaced apart opposite each other, to form an air gap 34 therebetween. The poles are joined at their opposite ends by means of permanent magnets 35 and 36, between which is a center magnetic core 37, extending therefrom towards the air gap axially coextensive therewith. Secured centrally in the forward end of center core 37 and extending outward therefrom through the air gap is cantilevered elastic reed 39, such as steel, brazed or otherwise attached at its end to the top of pin 14. The reed is adapted to vibrate responsively when a signal is transmitted into operating coil 40, and because of its elasticity has a restoring force as not to become magnetically latched to either of the poles but instead is inherently self centering. In this arrangement, two magnetic paths are provided for the magnetic fluxes. One path is for the flux produced by the permanent magnets and the other for the flux produced by the pulsating current applied to the operating coil. The paths are arranged to form a balanced configuration so that a center position exists with respect to the permanent magnet flux. The magnetic forces on the reed are unbalanced when operating flux exists such that the flux from the operating current passing through coil 40, passes through the reed to alter the flux in the air gap causing reed movement. The direction of movement is determined by the direction of the flow of the operating current.

The reed has a natural frequency of vibration, depending on its mass, elastic constant, and geometry according to the basic formula:

$$f_n = C_m \sqrt{gEI/Wl^4}$$

where $E$=Young's Modulus,
$g$=gravitational constant,
$l$=length
$I$=moment of inertia=$ab^3/12$, where $a$=width, $b$=thickness
$W$=weight per unit length,
$C_m$=constant depending upon boundary conditions and vibrational mode. (For a cantilever beam vibrating at the fundamental frequency, $C$=0.560.)

Exemplifying application of the above formula, with a fundamental vibrational frequency of about 2.6 kilocycles, a steel reed has a length of approximately 0.3 inch; a width of approximately 0.5 inch and a thickness of approximately 0.015 inch. With this geometry, the reed will respond to the operating current flowing through the coil 40 which induces an alternating magnetic flux in the reed effecting the vibration thereof.

Figure 7:
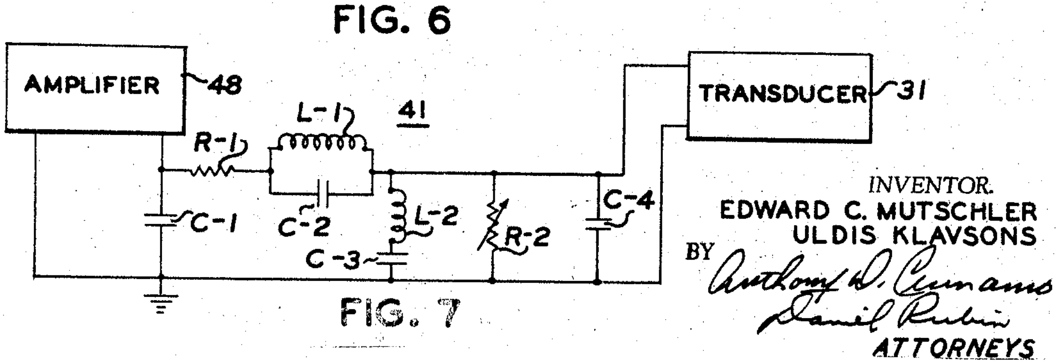
FIG. 7 is a schematic electrical circuit of a compensating network in accordance herewith.

Inherent in an elastic mechanical drive are the inertial forces and the elastic moment of the member causing delay in starting and stopping. This delay must be eliminated or held to a minimum to effect accurate print-out and when uncorrected is exemplified by curve A of FIG. 4. It shows up as start and stop transients when seen on an oscilloscope trace and will produce a loss in transmission resolution. In order therefore, to overcome the elastic moment of the reed whereby single dot print-out can be achieved, there is provided a compensating network in the form of a reject filter 41, commonly known as a "band elimination" filter. The basic characteristic of the filter is exemplified by curve B of FIG. 4 and provides an added power assistance at the beginning of a pulse and opposing power at the end of a pulse, effected by shaping the electrical pulse to compensate for the lack of reed response. A basic circuit for the compensating network is exemplified by FIG. 7. The capacity value of the different components will of course have to be varied for adaptation to the particular characteristics of the employed transducer. Likewise, other circuit arrangements could readily be conceived to obtain an analogous result as will readily occur to those skilled in the art. The combined system, i.e. by combining the resultants of curves A and B, produces a flat operative response of pin 14 indicated by curve C of FIG. 4 to in effect achieve a mechanical "Q" of substantially unity.

By utilizing the transducer in combination with the filter, the system as a whole has broad frequency response in order to reproduce a step function. Since the reed by itself has a narrow band pass response, the band rejection network introduces into the system a response directly opposite to that of the reed in order to achieve accurate compensation from the high peak power of the power amplifier. Where the wave shaping is carried out in an amplifier stage, the average power of the transducer is significantly reduced. The latter is true, since although the amplifier operates at a constant high power level, the transducer operates at a peak power level only at the beginning and end of each pulse. Not only has this combined transduction system been found to accurately increase the operating frequency of the system, up to and in excess of 6000 dots per second with skipping, drag-out or the like, but the transducer size and weight is significantly reduced as compared to a non-elastic transducer employed in the prior art.

Figures 5, 6:
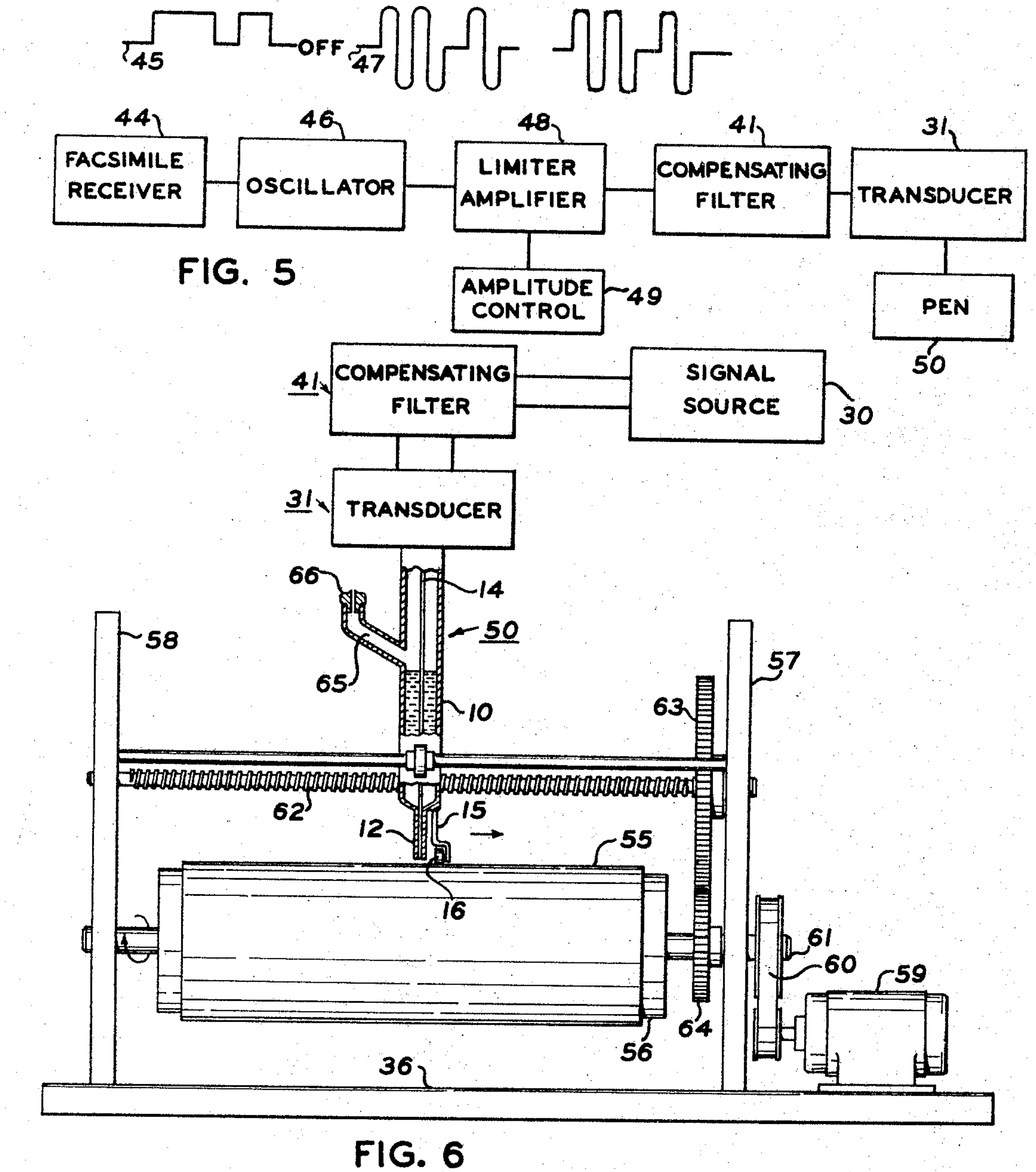
FIG. 5 is a block diagram representing a facsimile receiver system in accordance herewith.
FIG. 6 is a front elevation of a complete mechanical apparatus for facsimile recording in accordance herewith.

The complete facsimile recording system utilizing the transduction system of the invention is illustrated in block diagram in FIG. 5. Signals transmitted from a facsimile receiver 44 are illustrated by waveform 45. These signals can originate as described above, by scanning a document with a light and sensing the variations in reflectance with a photocell. When the photocell passes over white areas of the document, it emits an output current of one amplitude and when passing over characters or other dark areas on the original, it emits an electric current of a different amplitude. These discrete changes in current amplitude, occurring as the photocell scans printed characters, appear as pulses having widths representing the width of characters at the point being scanned. The information represented by these pulses, is conventionally added to a carrier wave for transmission by wire or radio to a facsimile receiver, such as receiver 44 shown in the diagram. The facsimile receiver amplifies and detects the information from the carrier wave, so that it appears again in a pulse configuration corresponding to that transmitted from the scanning photocell. Assuming that the positively going pulses represent areas on the original document sensed as a dark character, the first positive pulse illustrated in waveform 45 represents a dark area of one width while the second positive pulse represents a dark area of a lesser width.

The pulses from the receiver turn a sine wave oscillator 46 "on" and "off" to in turn emit a pulse oscillation. While waveform 47 from oscillator 46 is illustrated as generally sinusoidal, oscillator 46 is suitably a multivibrator. With waveform 45 at its positive level, the oscillator is "on" and with waveform at its negative level, the oscillator is "off." The oscillator frequency is fixed to correspond to the desired operational rate of the recording stylus so that the number of cycles in the pulse are equal to the picture elements to be printed. This of course, depends on the scan rate and may be two to five cycles for the thickness of a character line. However, as illustrated here for simplicity, waveform 47 shows two cycles of oscillations for the first and thicker of two pulses in waveform 45 and one cycle for the second and thinner of the two pulses.

There are two distinct operations by which an oscillator can be turned on and off by an electrical signal. By a first and preferable technique for these purposes, the electrical signal starts the oscillator with each "on" pulse and stops the oscillator with each "off" pulse. By a second method, the oscillator remains operating at all times and the electrical signal operates to open and close the path of the next stage of the circuit. Starting the oscillator from rest with each "on" signal ensures that the oscillator waveform begins at a reference potential and swings in the same direction at the beginning of each "on" pulse.

Following oscillator 46, a limiter amplifier 48 ensures that the waveform transmitted to the transducer system is uniform. Included with the amplifier is an amplitude control 49 to enable varying the amplitude of the waveform height so that the excursion amplitude of pin 14 can be varied slightly depending upon the type of ink and the type of recording sheet employed. After amplification, the information in the form of trains of sinusoidal voltages pulses, is fed through the compensating filter 41 and the transducer 31 to the recording pen 50.

In FIG. 6 there is illustrated an automatic facsimile recording apparatus, including the transduction system of the invention. As thereshown, a recording sheet 55 on which the information is to be recorded, is supported wrapped about a cylindrical drum 56 mounted for rotation between support members 57 and 58. The drum is driven by reversible motor 59 through drive belt 60 connected to drum shaft 61. Pen 50, as described above, is supported vertically radial adjacent the drum surface and transported axially thereto by means of a rotatable screw member 62. Screw member 62 is rotated by means of spur gear 63 secured at its end and meshing with spur gear 64 secured on the drum shaft. The gearing ratio is such that, as pen 50 moves one dot line width across the surface of drum 56, the drum completes a rotation. The pen 50 as illustrated herein is essentially similar to that described above in connection with FIG. 1. However, as adapted for automatic operation, there is included an ink filler spout 65 which includes vent type cap 66 preventing vacuum from occurring in the ink container.

By the above description, there is disclosed a novel transduction system capable of reliably increasing the operational frequencies of a mechanically operated facsimile recording pen. Not only is the capable operational frequencies of the pen increased thereby, but the transduction system per se employing an elastic transducer has substantially reduced physical bulk and requires less power in effecting its operation. Whereas, elastic transducers have been previously regarded as undesirable due to its elastic residual, by means of a compensating filter employed in combination therewith, the operating characteristics are such as to approach in effect a mechanical "Q" of unity. Such e result has not been obtainable by means of the prior art. Whereas, the pen mechanism has been described with generalities, more specific data and parameters can be found in the copending application cited above.

Since many changes could be made in the above construction and many apparently widely different embodiments of this invention could be made without departing from the scope thereof, it is intended that all matter contained in the drawings and specification shall be interpreted as illustrative and not in a limiting sense.

What we claim is:

1. A facsimile recording apparatus for recording liquid ink dots corresponding to information intelligence, said apparatus comprising in combination:

(a) a signal source for emitting signals of intelligence information to be recorded;

(b) support means supporting a recording surface;

(c) a recording pen containing liquid ink supported closely spaced to said recording surface on its support and including a reciprocable rod which when actuated conducts a dot quantity of ink therefrom onto said recording surface;

(d) an electrical-mechanical transducer including an elastic element connected to the rod of said pen for reciprocating said rod in response to a signal emitted from said signal source; and (e) an electrical compensating network connected to the input of said transducer to assist and oppose the elastic properties of said elastic element, said compensating network including a band reject filter shaping the electrical pulse input to said transducer.

2. A facsimile recording apparatus for recording liquid ink dots corresponding to information intelligence, said apparatus comprising in combination:

(a) a signal source for emitting signals of intelligence information to be recorded;

(b) support means supporting a recording surface;

(c) a recording pen containing liquid ink supported closely spaced to said recording surface on its support and including a reciprocable rod which when actuated conducts a dot quantity of ink therefrom onto said recording surface;

(d) an electromechanical transducer including (1) a pair of spaced apart magnetic members forming an air gap therebetween, (2) a coil wound core extending substantially axially aligned and perpendicular to the air gap between said magnetic members, (3) an elongated elastic element secoured cantilevered in said core extending therefrom through said air gap and connected at its free end to the reciprocable rod of said pen to reciprocate said rod in response to a signal emitted from said signal source; and (4) an electrical compensating network connected to the coil of said transducer to assist and oppose the elastic properties of said elastic element to produce single element print-out onto said recording surface.

3. The apparatus according to claim 2 in which the operational frequency is in the range of 1200–10,000 dots per second.

References Cited

UNITED STATES PATENTS

| | | | |
|---|---|---|---|
| 587,336 | 8/1897 | Short | 178—96 |
| 1,360,823 | 11/1920 | Thwing | 346—14 X |
| 2,646,518 | 7/1953 | Thompson | 310—21 |
| 2,999,632 | 9/1961 | Tailleur | 346—140 |
| 3,146,058 | 8/1964 | Henshaw | 346—140 |
| 3,191,101 | 6/1965 | Reszka | 317—148.5 X |

RICHARD B. WILKINSON, *Primary Examiner.*

J. W. HARTARY, *Assistant Examiners.*